United States Patent [19]

Sumoto et al.

[11] 3,880,976
[45] Apr. 29, 1975

[54] PRODUCTION OF ELASTIC YARN

[75] Inventors: Misao Sumoto; Hideki Komagata; Hiroshi Matsumoto, all of Honkatatacho, Japan

[73] Assignee: Toyo Boseki Kabushiki Kaisha, Osaka, Japan

[22] Filed: May 30, 1973

[21] Appl. No.: 365,138

Related U.S. Application Data

[63] Continuation-in-part of Ser. No. 879,829, Nov. 25, 1969, abandoned.

[30] Foreign Application Priority Data

Dec. 4, 1968  Japan.............................. 43-89224

[52] U.S. Cl.. 264/210 F; 260/28.5 A; 260/DIG. 19; 260/860; 264/211
[51] Int. Cl.............................................. D01d 5/12
[58] Field of Search............ 260/75 R, 28.5 A, 860, 260/DIG. 19; 264/290 T, 210 F, 211

[56] References Cited
UNITED STATES PATENTS

| | | |
|---|---|---|
| 3,023,192 | 2/1962 | Shivers............................ 260/75 R |
| 3,651,014 | 3/1972 | Witsiepe.......................... 260/75 R |
| 3,660,557 | 5/1972 | Smith et al........................ 264/211 |
| 3,701,755 | 10/1972 | Samoto et al..................... 260/75 R |

FOREIGN PATENTS OR APPLICATIONS 779,054  7/1957  United Kingdom.............. 260/75 R

*Primary Examiner*—Jay H. Woo
*Attorney, Agent, or Firm*—Wenderoth, Lind & Ponack

[57] ABSTRACT

The present invention relates to a process for preparing elastic filament for yarn with improved breaking strength and elastic recovery. The process comprises preparing a composition by adding 0.1 to 1 part of a fatty acid amine, fatty acid methylol amide or higher fatty acid ester to 100 parts of a polytetramethylene glycol-polyethylene terephthalate block copolymer of an inherent viscosity of more than 2.0 obtained from polytetramethylene glycol and polyethylene terephthalate, melt-spinning the composition to form filaments and stretching, then shrinking the formed filaments while heating them.

1 Claim, 1 Drawing Figure

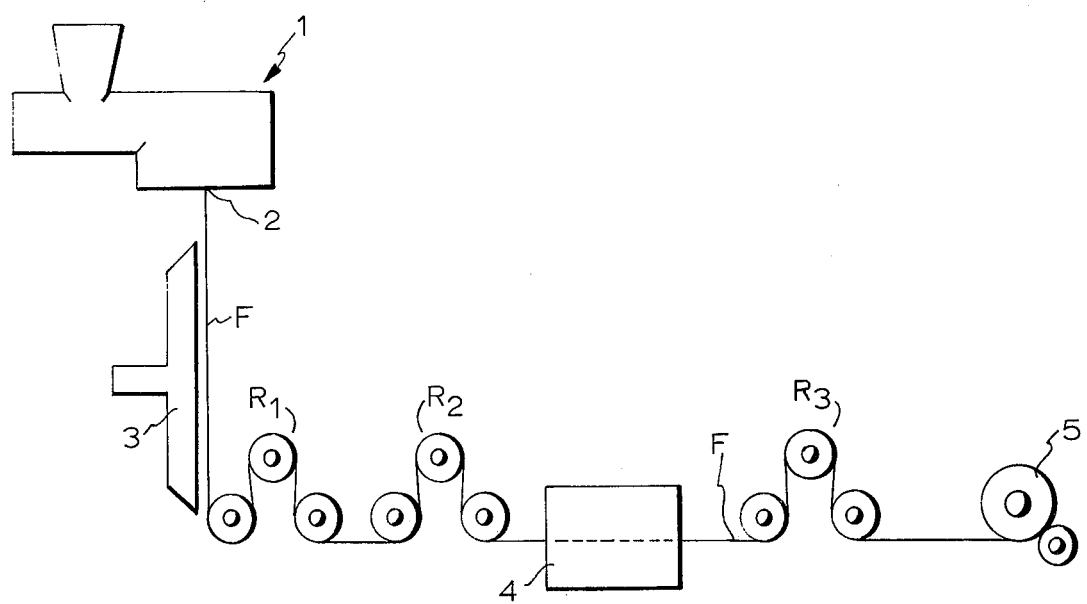

PRODUCTION OF ELASTIC YARN

This application is a continuation-in-part of applicants' co-pending application Ser. No. 879,829 filed Nov. 25, 1969, now abandoned.

This invention relates to an improvement in the production of elastic fibers or filaments having an excellent rubber-like elasticity from a polyester-polyether block copolymer.

It is known that an elastic yarn may be obtained from a block copolymer formed of polytetramethylene glycol (referred to as PTMG hereinafter) as one segment and polyethylene terephthalate (referred to as PET) as the other segment (U.S. Pat. No. 3,023,192). However, the elastic yarns mentioned in this U.S. patent are much inferior to the today marketed polyurethane elastic yarns (so-called Spandex) in the breaking strength, elongation and elastic recovery.

We have found that an elastic yarn having breaking strength and elastic recovery comparable with those of Spandex can be produced by remarkably increasing the polymerization degree of such PTMG-PET block copolymer with a particular composition and by subjecting such copolymer to spinning and after-treatment under proper conditions.

The PTMG-PET block copolymer from which an elastic yarn having such excellent properties is obtained according to this invention will be first explained in the following.

The composition of a PTMG-PET block copolymer can be indicated by the two parameters of the molecular weight of PTMG and the proportion of PTMG and PET. In this specification, as a method of indicating the latter, there is used PTGT wt.% which can be calculated from the ratio of PTMG and a terephthalic acid derivative [such as, for example, dimethyl terephthalate (DMT) or bishydroxyethyl terephthalate] at the time of the polymerization charge for the production of the block copolymer. The calculation may be made by the following formula:

$$\text{PTGT wt.\%} = \frac{\frac{\text{PTGT}}{\text{PTMG}}}{\frac{\text{PTGT}}{\text{PTMG}} + \left[\left\{\frac{W;\text{DMT}}{W;\text{PTMG} - \frac{\text{DMT}}{\text{PTMG}}}\right\} \times \frac{\text{EGT}}{\text{DMT}}\right]} \times 100$$

wherein W;DMT and W;PTMG represent the weights of the respective materials at the time of the charge and all the others represent the molecular weights. Further, PTGT represents the molecular weight of a unit of the ester of terephthalic acid (TPA) and PTMG, and EGT represents the molecular weight of a unit of the TPA ester of ethylene glycol (EG).

As particularly fundamental and important among the properties of an elastic yarn, there can be enumerated the breaking strength, elongation, elastic recovery and characteristics at a high temperature represented by the melting point. In the production of an elastic yarn from a PTMG-PET block copolymer, these fundamental properties will vary with the composition of the copolymer and the treatment of the yarn formed therefrom. Therefore, it is necessary to select the copolymer composition and treating method so that an elastic yarn in which the above described properties are well balanced may be obtained. As criteria of the desired properties in such case, the property values of Spandex and latex rubber yarns which have already been commercialized and whose utility as elastic yarns has been well recognized may be taken into consideration.

As for the elongation, a higher value is not always desired and there should be a proper value. The elongation of most of the commercial Spandex yarns is 500 to 600 percent and that of the latex rubber yarn is 650 to 745 percent. (refer to Man-Made Fibers, Vol. 3, pages 411 and 422, edited by H. F. Mark et al., John Willey & Sons, Inc.) In the present invention, it is intended to produce elastic yarns having an elongation of 500 to 700 percent. The elongation was measured by the following method. Thus a sample of 5 cm. long was stretched at a rate of 1000 percent per minute. The strength (W g) and length (L cm) when the sample was broken were measured.

$$\text{Elongation} = \frac{L - 5}{5} \times 100 \quad (\%)$$

$$\text{Strength} = \frac{W}{d_o}$$

$$\text{Strength per denier at the time of breakage} = \frac{W}{d} \quad \text{at break}$$

wherein $d_o$ represents the denier of the sample before stretched.

We have found that the elongation, melting point and elastic recovery have tendencies reverse to one another with respect to the composition. Therefore, for the elastic recovery, a temperature of 20°C. was selected to represent the temperature at which yarns are generally used and the aim was directed to an elastic recovery from 300 percent (referred to as $ER_{300}$) which is same as or higher than that of Spandex i.e. 93 percent or higher, at such temperature. The $ER_{300}$ was measured as follows:

$ER_{300}$:

A sample 5 cm. long is elongated at 300 percent elongation at 20°C. and left to stand for 10 minutes. Then the sample is released from the elongation and left to stand for 10 minutes. The length $l$ (cm.) of the sample is measured. The elastic recovery is calculated by the following formula:

$$ER_{300} = \frac{5 - (l - 5)}{5} \times 100 \quad (\%)$$

The melting was directed to 165°C. or higher as measured by the following method. Thus, a small piece of a sample is placed on a hot plate of an apparatus for measuring a melting point of a slight mass, and is heated at a rate of 1°C. per minute and is observed with rectangularly intersecting polarized lights. The temperature at which the bright light goes out is taken as the melting point.

A knit or woven fabric made by using elastic yarns having such melting point can be dyed or processed in the same manner as for a knit or woven fabric made by using Spandex.

Further, the elastic recovery at a low temperature under a high elongation, referred to as $T_{50}$, was determined as follows: Thus, a yarn sample 3 cm. long was elongated at 400 percent elongation at various temperatures, was left for 10 seconds as it was and was released from the elongation at said temperature. After 30 seconds the length $l_2$ was measured and the low-temperature elastic recovery was evaluated by the temperature ($T_{50}$) at which the distortion rate obtained from the following formula exceeded 0.5:

$$\text{Distortion rate} = \frac{l_2 - 3}{3}$$

The temperature ($T_{50}$) at which the elastic recovery from 400 percent elongation became less than 50 percent by this measurement was aimed to be below 15°C. in our invention. Generally it is in the step of producing a knit or woven fabric by using elastic yarns that the elastic yarns are subjected to a high elongation of more than 400 percent. Once a fabric has been made, the elastic yarns will be subjected to an elongation only up to 300 percent at most. In an actual knitting or weaving step of elastic yarns having the above aimed low-temperature elastic recovery, no particular troublesome problem has occurred.

Now, in the case of producing an elastic yarn of an elongation of 500 to 700 percent from a PTMG-PET copolymer, the relations of the copolymer composition with the properties of the yarn shall be described. The higher the average molecular weight of PTMG and the higher the PTGT content, the higher the $ER_{300}$. Further, it has been found that it is necessary to make the molecular weight of PTMG higher than 1800 and to make PTGT wt.percent more than 75 percent in order to make $ER_{300}$ not lower than 93 percent. The higher the molecular weight of PTMG, the lower the elastic recovery at a low temperature under a high elongation. The lower the PTGT content, the higher the melting point. In order to make it higher than 165°C., it was necessary to make PTGT wt. percent not higher than 82 %. It has thus been found that an elastic yarn having excellent properties can be obtained only from a composition in such extremely limited range.

Further, in order to obtain an elastic yarn excellent in the elastic recovery and breaking strength, it is indispensable to use a copolymer of a high polymerization degree. In order to obtain an elastic yarn of $ER_{300}$ of more than 93 percent from a copolymer having a composition in the above described range, it is necessary that the inherent viscosity should be not less than 2.0. By the way, the inherent viscosity was measured as follows:

Inherent viscosity:

The viscosity of a polymer solution of a concentration of $C=0.2$ g./100 c.c. dissolved in a mixed solvent of phenol-tetrachloroethane (60:40) was measured at 30°C. The viscosity of the mixed solvent was also measured at 30°C. Then their ratio was made $\eta_r$. The inherent viscosity was defined by the following formula:

$$\frac{l_n \eta_r}{C}$$

The process for producing an elastic yarn from such PTMG-PET block copolymer shall be described in the following. The copolymer is melted, for example, with an extruder and is extruded through orifices and the extruded filament is cooled to be solidified by using water, a chilling roller or air as a cooling medium. In such case, it is desirable that the ratio of the linear velocity of the filament at the solidification end point to the linear velocity of the filament at the spinning nozzle outlet (which ratio shall be abbreviated as ND hereinafter) should be not higher than 20. The birefringence $\Delta_n$ of the unstretched filament obtained thereby is in a range of 5 to 15 × $10^{-4}$. If ND is made 20 or higher, the denier fluctuation of the yarn will become remarkable. By this way, the denier fluctuation was measured as follows:

Denier fluctuation:

20 samples (each 45 cm. in length) were continuously cut off from the yarn. The weight of each sample was measured and its maximum value $W_{max.}$, minimum value $W_{min.}$, and average value $W_{av.}$ were determined. The denier fluctuation was evaluated in the range defined by the following formula:

$$\text{Denier fluctuation} = \frac{W_{max.} - W_{min.}}{W_{av.}} \times 100 \quad (\%)$$

When the ND is made further larger, it is possible to make $\Delta_n$ of a filament in an unstretched state larger than 20 × $10^{-4}$. However, in such case, in order to obtain an intended elongation by heating and shrinking the filament after stretching it, it will be necessary to keep the filament temperature (when it shrinks) at or below 160°C. at which the filament deteriorates. The unstretched filament having $\Delta_n$ in the above described range has an elongation of 850 to 900 percent, strength of 0.4 g./d. and $ER_{300}$ of 78.0 percent and can not be used in practice. Therefore, the cooled and solidified filament is continuously stretched without being wound up as unstretched. In such case, if the filament is stretched by varying the draw ratio and the stretching tension is measured, the tension will increase slowly at first with the increase of the draw ratio but will increase quickly at certain draw ratio and, if the draw ratio is further increased, the filament will break at last. It has been found that, in case the filament is stretched below the draw ratio at which the stretching tension begins to quickly increase, only a yarn low in such properties as the breaking strength and elastic recovery will be obtained but that, when the filament is stretched above the draw ratio at which the tension begins to quickly increase, a yarn remarkably high in the properties comparable with thos of Spandex can be obtained. Thus, there is a definite necessary minimum draw ratio (abbreviated as $\alpha_{min.}$ hereinafter) for making the yarn with excellent properties. This draw ratio coincides with the ratio at which the stretching tension begins to quickly increase. There is a tendency that $\alpha_{min.}$ becomes higher as the molar ratio DMT/PTMG becomes smaller, as the stretching temperature becomes higher and as the amount of additive(s) becomes larger. According to experiments, it has been found that, in the case of stretching an unstretched filament (of a copolymer of the above mentioned composition) of $\Delta_n$ of 5 to 10 × $10^{-4}$ at 10° to 30°C., it is desirable to stretch the same at least 4.5 times, preferably more than 5.5 times the length. Further, generally, even if it is stretched more than 8 times the length, the breaking strength and elastic recovery will be not correspondingly improved and the filament will become likely to break. Therefore, it is desirable to stretch the filament 8 times or less the length.

When the stretching is conducted at a temperature below 0°C., the strength of the filament will tend to reduce and, even if the temperature is above 40°C., the strength will also tend to reduce. However, if the stretching temperature is above 60°C., the $\alpha_{min.}$ and the breaking draw ratio of the filament will become so close to each other that the operation will become difficult. Further, it has been found that, in such case, if the filament is stretched at a draw ratio smaller than $\alpha_{min.}$, the elongation of the resulting yarn becomes too high, i.e. 700 percent or higher. Therefore it is preferable to conduct the stretching at a temperature of 10° to 30°C.

It is necessary to carry out such stretching immediately following the cooling and solidification of the filament. It is observed that, if the filament is left in the unstretched state, the modulus will increase quickly with the lapse of time. For example, when the unstretched filament left at 20°C. for 3 minutes is elongated by 100 percent, the modulus will be 0.007 g./d. but, when the same unstretched filament is left at 20°C. for 24 hours the modulus will be 0.035 g./d. In the case of stretching the unstretched filament whose modulus has been increased by being left for a long time, in order to smoothly carry out the stretching to obtain a yarn having the breaking strength, elastic recovery and elongation at the above described values and favorable in the dimensional thermostability, it is necessary to set the stretching temperature at 60° to 80°C. and to bring the filament temperature at the time of shrinking closer to the temperature at which the deterioration of the filament begins to occur. As a result, it is difficult to obtain favorable yarn properties. In stretching usual nonelastic synthetic fiber or filament (such as, for example, nylon-6, nylon-66, etc.), it is usual to stretch the filament after winding it up as unstretched and leaving it for a predetermined period of time. Rarely it is stretched following its cooling and solidification. However, the optimum stretching temperature does not vary much between them. Further, in the case of stretching an unstretched filament of a PTMG-PET block copolymer, no such neck as is seen in the cold-stretching of a general nonelastic synthetic fiber filament will be observed but there will be a comparatively long distance from the stretching beginning point to the end point.

Then, the stretched filament is shrunk under heating. The object of such shrinking treatment is to improve the dimensional thermostability and to increase the elongation of the filament so as to be 500 to 700 percent. When the filament was stretched at a draw ratio larger than $\alpha_{min.}$ or was heat-treated under a fixed length (i.e. without relaxing to allow shrinkage), the elongation of the resulting filament was generally less than 350 percent. Further, in respect of the internal structure of the filament, the PTMG segment oriented by the previous stretching will be unoriented and, at the same time, the crystallization of the PET segment acting as cross-linking sites will be accelerated by such heat shrinking treatment. When the stretched filament is heated, it will instantly shrink. In such case, the higher the temperature of the filament and the larger the draw ratio, the larger the shrinkage. In this case, the conditions for the shrinking treatment may be expressed by a ratio of the length of the filament after the stretching and thermal shrinkage to the length of the filament as unstretched (which ratio shall be referred to as NDR hereinafter). The NDR value shows the extent to which the filament has been stretched finally. It has been found that, in case the filament is stretched above $\alpha_{min.}$, NDR and the elongation of the filament will be correlated with each other. More particularly, the relation between the elongation of the filament and NDR varies with the $\Delta_n$ of the filament as unstretched before the stretching, stretching temperature and copolymer composition but, if they are in the above described respective ranges, the elongation of the final filament within a range of 500 to 700 percent can be attained by keeping NDR in a range of 1.3 to 1.8. It has been found that, in order to obtain the above effect, the temperature of the filament at the shrinking treatment should be 100 to 150°C.

In carrying out the above mentioned spinning, cooling, stretching and heat-shrinking treatment any suitable apparatus may be used. The accompanying single drawing schematically shows an apparatus which may be used.

The polyester-polyether block copolymer is melted and extruded by an extruder 1 through spinning orifices 2 to form filaments F, which are cooled by a cooling means 3 to solidify. The solidified filaments are stretched between rollers $R_1$ and $R_2$. Then the stretched filaments are shrunk under heating by being passed through a heating zone 4 arranged between rollers $R_2$ and $R_3$. The shrunk filaments F are then wound on a take-up roll 5.

In order to obtain the effect of shrinking it is necessary that the filaments are travelled through the heating zone 4 with a tension as small as possible. If not, NDR can not be reduced to the intended value and the elongation can not be made to be at the intended value. It has been found that, in order to run the filament so as to satisfy such conditions, it is preferable to take the following measure. Thus the stickiness of the filament to the rollers $R_2$, $R_3$, etc. is so large that, if no special measure is made, the filament will be adhered to and wound up on the roller $R_2$ at a shrinkage far smaller than the intended shrinkage (that is, the speed of roller $R_3$ and consequently NDR is larger than the intended value), and filament having a desired elongation can not be obtained. It has been found that, as a method of preventing such sticking of the filament to the rollers, it is most effective to add a special anti ticking agent to the copolymer.

As antisticking agents which are useful for such purpose, there are enumerated fatty acid amides, fatty acid methylol amides and higher fatty acid esters. More specifically, the fatty acid amides are those monoamides having a melting point higher than 90°C. and 10 to 30 carbon atoms in the fatty acid moiety, such as, for example, stearic acid amide or palmitic acid amide. The fatty acid methylol amides are those expressed by the following general formula:

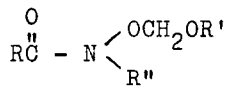

wherein R is phenyl group, monovalent aliphatic fatty acid residue $C_nH_{2n+1}$ ($n$ is 10 to 30) or divalent aliphatic acid residue $C_nH_{2n}$ ($n$ is 10 to 30), R' is hydrogen or a lower alkyl group and R'' is hydrogen, —CH$_2$OH or —CH$_2$OR'.

Further, the higher fatty acid ester is natural wax or synthetic wax.

The amount of addition of such antisticking agent is preferably 0.1 to 1 percent by weight based on the block copolymer.

The addition of such antisticking agent is not only useful for effecting the continuous heat shrinking treatment but also advantageous in facilitating the separation from the rollers for stretching.

Generally an elastic yarn obtained from a PTMG-PET copolymer has a drawback thatm when it is subjected to high elongation such as more than 5 times the length, its elastic recovery at a low temperature, for example, at the room temperature will reduce to be lower than that of Spandex. The reason for such low recovery from the high stretching at a low temperature is thought to be that, when the elastic yarn is subjected to the high stretching, the PTMG segments in the PTMG-PET block copolymer will be oriented in the axial direction of the yarn to produce crystals whose melting point is higher than the temperature at which the elastic recovery is being measured so that, even if the stretch of the yarn is released, the produced crystals will not disappear. In Spandex, excellent properties will be obtained usually without stretching treatment but, in an elastic yarn from a PTMG-PET copolymer, no excellent property will be obtained without a stretching treatment. Therefore, the PTMG segments in the elastic yarn of a PTMG-PET block copolymer is more highly oriented in the axial direction of the yarn than the PTMG segments in Spandex. Therefore, it is thought that, under the same draw ratio, the former is far more likely to be oriented and crystallized in the PTMG segments.

We have found that the above drawback can be overcome by lowering the melting point of the crystals of the PTMG segments produced by the stretching of the yarn. We have further found that an elastic yarn improved in the elastic recovery at a low temperature under a high stretch can be obtained by adding such special additive as is described in the following to a PTMG-PET block copolymer. The additive having such effect should be compatible perfectly with PTMG, should remarkably act to reduce the melting point of the crystals of PTMG, should be itself very thermostable, should have a high boiling point or should have no boiling point in fact and should be chemically inert to a PTMG-PET block copolymer. As satisfying these conditions, there has been found an oligomer of styrene, α-methyl styrene or vinyl toluene or an oligocopolymer of them having an average molecular weight of 300 to 1,000. An oligomer of a molecular weight lower than 300 is thermally unstable and therefore can not be used. An oligomer of a molecular weight higher than 1000 is low in the compatibility with PTMG and acts little to reduce the melting point of the crystals of PTMG.

It is necessary that the amount of addition of the additive to improve the elastic recovery at a low temperature under a high stretch should be 5 to 15 PHR (parts per hundred parts of the resin by weight) to the copolymer. In case the amount of addition is smaller than that, $T_{50}$ will not become lower than 15°C. Further, in case the amount of addition is larger than that, the breaking strength and melting point of the yarn will reduce so remarkably that it is not desirable. With the amount of addition in the above mentioned range, the melting point of crystals consisting of the PET segments in a PTMG-PET copolymer to which such additive has been added is not substantially different from that of the copolymer to which such additive has not been added and the properties at a high temperature are not also substantially different. This is thought to be because the added oligomer is perfectly selectively dissolved in the coagulated phase of the PTMG segments in the copolymer.

The invention will be further explained by referring to the following Examples.

EXAMPLE 1

38.8 parts of dimethyl terephthalate, 29 parts of ethylene glycol and 100 parts of polytetramethylene glycol (an average molecular weight of 2000) were reacted together in the presence of 0.04 part of zinc acetate and 0.03 part of germanium oxide to obtain a PTMG-PET block copolymer containing 78.7 percent of PTGT and having an inherent viscosity of 2.38. Then 10 PHR of oligostyrene having an average molecular weight of 400 and 0.5 PHR of stearic acid amide were added to this copolymer. An elastic yarn was produced from this composition with an apparatus shown in FIG. 1. This composition was melted at 240°C. and was extruded through orifices (each 1.0 mm. in diameter) to form filaments. The extruded filaments were cooled with water at 20°C. and were travelled on underwater rollers moving at a surface velocity of 60 m./min. The cooled and solidified filaments were pulled up out of the water. The $\Delta_n$ of the unstretched filament was $7 \times 10^{-4}$. Then the filaments was stretched 6 times the length at 20°C. between the group of rollers $R_2$ rotating at a surface velocity of 360 m./min. and the group of rollers $R_1$ moving at a surface velocity of 60 m./min. The stretched filaments were then shrunk at a filament temperature of 120°C. in a heating zone 4 in which heated air was being circulated and was then wound up at 5. The velocity of the group of rollers $R_3$ was 87 m./min. and NDR was 1.45.

The resulting filament was of a fineness of 1120 deniers, elongation of 600 percent, breaking strength of 0.7 g./d., $ER_{300}$ of 94.0 percent, $T_{0.5}$ of 12°C. and melting point of 203°C.

EXAMPLES 2 to 9

PTMG-PET block copolymers of various different compositions were obtained in the same manner as in Example 1 by varying the average molecular weight and amount of PTMG and the amounts of DMT and EG. Then 10 PHR of an α-methyl styrene oligomer of an average molecular weight of 400 and 0.5 PHR of stearic acid amide were added to each of such copolymers. This composition was melted, extruded or spun, cooled, stretched, heated and shrunk so that NDR became 1.45. The fineness of each of these yarns was 1120 deniers. The elongation, $ER_{300}$, $T_{50}$ and melting point of each of these yarns are shown in Table 1.

Table 1

| Example | PTMG ($M_n$) | PTGT (wt.%) | Properties of yarns | | | |
|---|---|---|---|---|---|---|
| | | | Elongation (%) | $ER_{300}$ (%) | $T_{50}$ (°C.) | Melting point (°C.) |
| 2 | 1800 | 77.0 | 550 | 93.2 | 10.2 | 202 |
| 3 | 1800 | 83.4 | 620 | 93.4 | 12.0 | 172 |
| 4 | 2000 | 76.0 | 580 | 93.0 | 11.3 | 210 |
| 5 | 2000 | 78.7 | 600 | 94.0 | 12.0 | 203 |
| 6 | 2000 | 81.6 | 630 | 94.8 | 13.5 | 185 |
| 7 | 2200 | 77.6 | 600 | 93.6 | 12.0 | 208 |
| 8 | 2200 | 80.2 | 630 | 94.8 | 13.0 | 196 |
| 9 | 2200 | 82.9 | 670 | 95.0 | 13.5 | 180 |

EXAMPLES 10 to 16

PTMG-PET block copolymers of different compositions were obtained in the same manner as in Example 1 by varying the molecular weight and amount of PTMG and the amounts of DMT and EG. Various oligomers and 0.5 PHR of palmitic acid amide were added to these copolymers. The thus obtained composition was melted, spun, cooled, stretched, heated and shrunk in the same manner as in Example 1 so that NDR became 1.45. These yarns were of a fineness of 1120 deniers and elongation of 550 to 680 percent.

The $T_{50}$ and melting point of each of these yarns are shown in Table 2.

EXAMPLE 17

In producing a yarn of 140 deniers from the composition prepared according to Example 1, the composition was melted at 230°C., extruded through orifices (diameter 0.6 mm.). The ratio (ND) of the linear velocity at the cooling solidification end point to the linear velocity at extrusion was made 11.0. The denier fluctuation of this yarn was 5.2 percent. In case ND was made 30.5 by extruding through orifices of a diameter of 1.0 mm. as a control, the denier fluctuation was as high as 25.1 percent.

EXAMPLES 18 to 28

In the production of an elastic yarn from the composition obtained in the same manner as in Example 1 with such apparatus as in FIG. 1, the composition was extruded at 230°C. through orifices of a diameter of 0.8 mm. and the filament was cooled and solidified at a velocity of 100 m./min. The $\Delta_n$ of this unstretched filament was $8 \times 10^{-4}$. Then the filament was stretched by varying the stretching temperature and draw ratio and was then shrunk by varying the shrinking temperature. The fineness of the obtained yarn was 280 deniers. The elongation, strength per denier at the time of breaking and $ER_{300}$ of each of these yarns are shown in Table 3.

Table 3

| Example | Stretching | | Shrinking filament temperature (°C.) | NDR | Properties of yarns | | |
|---|---|---|---|---|---|---|---|
| | Temperature (°C.) | Ratio | | | Elongation (%) | Strength per denier at the time of breaking (g./d.) | $ER_{300}$ |
| 18 | 10 | 4.5 | 120 | 1.40 | 600 | 4.6 | 93.0 |
| 19 | 10 | 5 | 120 | 1.40 | 600 | 4.8 | 93.6 |
| 20 | 20 | 5 | 120 | 1.45 | 600 | 4.7 | 93.5 |
| 21 | 20 | 6 | 120 | 1.45 | 600 | 4.9 | 94.0 |
| 22 | 20 | 7 | 120 | 1.46 | 590 | 5.2 | 94.3 |
| 23 | 30 | 5 | 120 | 1.48 | 590 | 4.6 | 93.5 |
| 24 | 30 | 6 | 120 | 1.48 | 600 | 4.8 | 94.0 |
| 25 | 30 | 7 | 120 | 1.49 | 590 | 4.9 | 94.2 |
| 26 | 20 | 6 | 100 | 1.65 | 530 | 4.9 | 94.3 |
| 27 | 20 | 6 | 130 | 1.42 | 640 | 4.8 | 93.2 |
| 28 | 20 | 6 | 140 | 1.38 | 680 | 4.7 | 93.0 |
| Control 4 | 0 | 4.5 | 120 | 1.40 | 580 | 4.0 | 92.8 |
| " 5 | 40 | 7 | 120 | 1.52 | 550 | 4.3 | 93.5 |
| " 6 | 20 | 1 | 20 | 1 | 890 | 3.7 | 78.0 |
| " 7 | 20 | 1 | 120 | 1 | 900 | 3.6 | 76.0 |
| " 8 | 20 | 4 | 120 | 1.42 | 620 | 4.3 | 86.0 |
| " 9 | 20 | 5 | 120 | 2.1 | 340 | 3.8 | 53.0 |

Table 2

| Example | PTMG ($M_n$) | PTGT (wt.%) | Oligomers | | Amount (PHR) | Properties of yarns | |
|---|---|---|---|---|---|---|---|
| | | | Kind | $M_n$ | | $T_{50}$ (°C.) | Melting point (°C.) |
| 10 | 2200 | 85.9 | Styrene | 300 | 10 | 13.0 | 168 |
| 11 | 2200 | 85.9 | " | 400 | 15 | 12.8 | 165 |
| 12 | 2000 | 78.7 | " | 300 | 5 | 14.5 | 204 |
| 13 | 2000 | 78.7 | " | 300 | 10 | 12.0 | 203 |
| 14 | 2000 | 78.7 | " | 300 | 15 | 11.0 | 202 |
| 15 | 2000 | 78.7 | " | 1000 | 15 | 12.2 | 202 |
| 16 | 1800 | 77.0 | Vinyl toluene | 300 | 10 | 9.7 | 201 |
| Control 1 | 2200 | 85.9 | | | 0 | 18.5 | 168 |
| " 2 | 2000 | 78.7 | | | 0 | 17.5 | 204 |
| " 3 | 1800 | 77.0 | | | 0 | 17.0 | 202 |

EXAMPLE 29

10 PHR of a styrene oligomer of an average molecular weight of 400 and 0.5 PHR of stearic acid amide were added to a PTMG-PET block copolymer containing PTMG of an average molecular weight of 1800 and PTGT wt. percent of 77.0 percent. In producing a yarn of 280 deniers from this composition, the filament was stretched 5.5 times the length at 20°C. and was shrunk at 125°C. to obtain a yarn of NDR of 1.42 and $ER_{300}$ of 93.0 percent.

EXAMPLE 30

5 PHR of a styrene oligomer of an average molecular weight of 400 and 0.5 PHR of stearic acid amide were added to a PTMG-PET block copolymer containing PTMG of an average molecular weight of 2000 and PTGT wt. percent of 76.0 percent. In producing a yarn of 280 deniers from this composition, the filament was stretched 6 times the length at 20°C. and was shrunk at 130°C. to obtain a yarn of an elongation of 610 percent. When it was shrunk at 150°C., a yarn of an elongation of 700 percent and $ER_{300}$ of 93.0 percent was obtained.

CONTROL 10

In Example 1, the unstretched filament was wound up and left to stand at 20°C. for 20 days. Then the filament was fed through rollers $R_1$ of 60 m./min. at 20°C. and was stretched by varying the surface velocity of the rollers $R_2$. In this case, the filament was broken at a draw ratio of 5.7 times. The yarn therefore was stretched 5 times the length and subjected to shrinking at 120°C. The resulting filament had an elongation of 720 percent, strength per denier at the time of breaking of 3.8 g./d. at break and $ER_{300}$ of 86 percent.

EXAMPLE 31

Yarns of 140 deniers were continuously produced with an apparatus as shown in FIG. 1 by adding 10 PHR of a styrene oligomer of an average molecular weight of 400 to a copolymer obtained in the same manner as in Example 1 and varying the kind and amount of addition of the antiblocking agent. The velocities of the groups of the rollers $R_1$ and $R_2$ were respectively 100 and 600 m./min. In each case, the temperature of the heating zone 4 was set a that the filament temperature because 120°C. The minimum velocity of the roller $R_3$ at which the filament could run stably was measured and the elongation of the yarn obtained thereby was measured. The results are shown in Table 4.

Table 4

| Example | Antiblocking agent | | Minimum velocity of roller $R_3$ (m./min.) | NDR | Elongation (%) |
|---|---|---|---|---|---|
| | Kind | Amount (PHR) | | | |
| 29 – 1 | Stearic acid amide | 0.1 | 155 | 1.55 | 570 |
| – 2 | " | 0.5 | 145 | 1.45 | 600 |
| – 3 | Palmitic acid amide | 0.1 | 155 | 1.55 | 570 |

Table 4 – Continued

| Example | Antiblocking agent | | Minimum velocity of roller $R_3$ (m./min.) | NDR | Elongation (%) |
|---|---|---|---|---|---|
| | Kind | Amount (PHR) | | | |
| – 4 | " | 0.5 | 145 | 1.45 | 600 |
| – 5 | Methylolated cured beef tallow acid amide | 0.1 | 155 | 1.55 | 570 |
| – 6 | " | 0.5 | 145 | 1.45 | 600 |
| – 7 | Montanic acid ester | 0.1 | 160 | 1.60 | 530 |
| – 8 | " | 0.5 | 145 | 1.45 | 600 |
| Control 11 | None | 0 | 210 | 2.10 | 400 |
| " 12 | Stearic acid | 0.5 | 195 | 1.95 | 430 |
| " 13 | N,N'-ethylene bisamide | 0.5 | 195 | 1.95 | 430 |

What is claimed is:

1. A process for producing elastic filaments wherein: a composition prepared by adding
   a. 5 to 15 parts of an oligomer of styrene, α-methyl styrene or vinyl toluene or a copolymerized oligomer thereof of molecular weight of 300 to 1,000 and
   b. 0.1 to 1 part of a fatty acid amide, fatty acid methylol amide or higher fatty acid ester to
   c. 100 parts of a polytetramethylene glycolpolyethylene terephthalate block copolymer of an inherent viscosity of more than 2.0 obtained from polytetramethylene glycol having a molecular weight of 1800 to 2000 and polyethylene terephthalate the content of which in the copolymer is 75–82 percent by weight, is melt-spun to form filaments, which after being cooled and solidified, are stretched at a draw ratio of 4.5 to 8 at a temperature of 10°–30°C. and then the filaments are shrunk at a filament temperature of 100°–150°C. so that the NDR (net draw ratio) is 1.3–1.8.

* * * * *